United States Patent
Brinkmann et al.

[15] 3,661,450
[45] May 9, 1972

[54] PHOTOGRAPHIC SLIDE PROJECTORS

[72] Inventors: Gerhard Brinkmann; Frohmut Muller, both of Braunschweig, Germany

[73] Assignee: Voigtlander Aktiengesellschaft, Braunschweig, Germany

[22] Filed: Sept. 22, 1969

[21] Appl. No.: 859,683

[30] Foreign Application Priority Data

Mar. 22, 1969 Germany......................P 19 14 700.3

[52] U.S. Cl..............................................................353/92
[51] Int. Cl. ........................................................G03b 23/04
[58] Field of Search ...............................353/21, 92, 114, 116

[56] References Cited

UNITED STATES PATENTS

| | | |
|---|---|---|
| 2,978,823 | 4/1961 | Wiklund...............................353/92 X |
| 3,180,212 | 4/1965 | Hillegonds et al.......................353/21 |
| 3,377,916 | 4/1968 | Zillmer....................................353/92 |
| 3,459,474 | 8/1969 | Aasen et al. ............................353/21 |
| 3,462,216 | 8/1969 | Bennett................................353/21 X |

Primary Examiner—Harry N. Haroian
Attorney—Blum, Moscovitz, Friedman & Kaplan

[57] ABSTRACT

A photographic slide projector wherein a slide-changer is adapted to shift slides successively from a magazine to a projecting position and then back to the magazine. When each slide is in the projecting position it is held by a slide-holder, and this holder is supported for swinging movement by the housing of the projector. In this way, when the slide-holder is swung outwardly it is accessible to manually receive a slide which then can be manually removed therefrom. On the other hand, the slide-holder can remain in an operative position where it will receive a slide from the slide-changer and return a slide thereto.

1 Claims, 3 Drawing Figures ns. 3,661,450

PHOTOGRAPHIC SLIDE PROJECTORS

BACKGROUND OF THE INVENTION

The present invention relates to photographic projectors.

Thus, the present invention relates to photographic projectors of the type where transparencies in the form of slides are situated in a magazine to be shifted out of the magazine to a projecting position and then back to the magazine by way of a slide-changer.

The invention relates in particular to that type of slide projector which makes it possible for the operator to manually introduce and remove slides from the projection position without necessarily using the slide-changer and a slide in the magazine.

With known projectors of this latter type it is indeed possible to remove the slide-holder from the housing of the projector in a manner completely independent of the magazine and the slide-changing structure. After the slide-holder is removed in this way, a slide may be manually introduced or removed therefrom. In order to again mount the slide-holder at a proper position in the projector to locate the slide carried thereby accurately at the projecting position, very special care must be taken and special manipulations are required. Such a separable slide-holder can easily become lost because it is a separate component which can easily be removed from the projector. Inasmuch as the slide-holder can be removed independently of the magazine and independently of the slide-changing device, it is possible to provide an unintentional actuation of the slide-changer when the slide-holder is not present, so that a slide can in this way fall into the interior of the projector. Under these conditions it is not easy to remove such a slide from the interior of the projector and return it to the magazine. Furthermore, it is possible for such a slide to prevent return of the slide-holder to the projector.

SUMMARY OF THE INVENTION

It is accordingly a primary object of the present invention to provide a construction which will avoid the above drawbacks.

In particular, it is an object of the invention to provide a slide-holder which is readily accessible for manual introduction and removal of slides while at the same time avoiding such drawbacks as the possibility of becoming lost, the possibility of actuation of the slide-changer at an improper time, and the possibility of dropping of a slide into the interior of the projector.

In particular, it is an object of the present invention to provide an interrelationship between the movable components of the projector which will reliably prevent any faulty manipulations or actuation of the components.

According to the invention the slide-holder means is turnably carried by the housing of the projector for movement to and from a position where it is possible to have manual access to the slide holder to introduce or remove a slide therefrom. When the slide-holder means is in a given operating position it will coact with the slide changer to bring about proper movement of the slide away from and back to a magazine. The parts include blocking-and-release means to prevent operation of components when they should not be operated and to permit operation only when the parts are properly set to provide for proper operation. Thus, the components such as the slide-changing means and slide-holding means can have coacting projections and recesses or the like which are positioned with respect to each other in such a way that swinging of the slide holder can only take place, for example, when the slide-changer is in a predetermined end position. It is also of advantage to provide a shutter which can block the travel of light along the optical axis through the projecting position of a slide, with the movement of this shutter means to and from its light-blocking position being controlled by the swinging movement of the slide-holding means.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
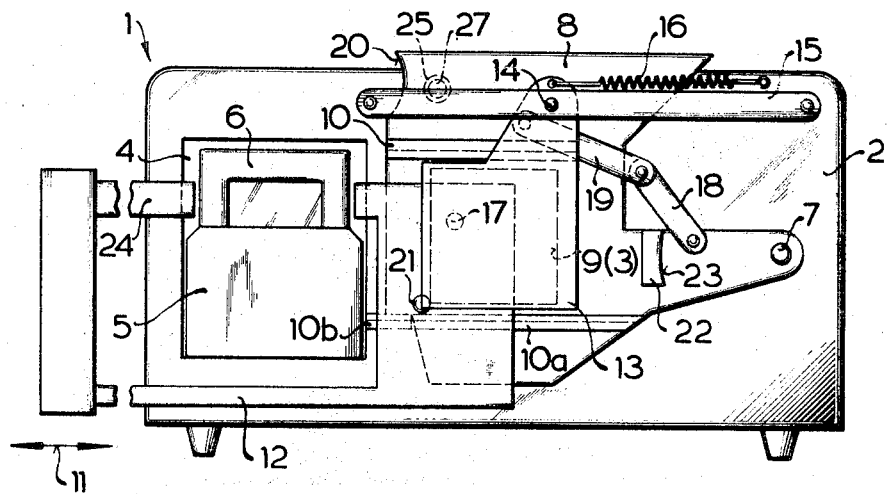
FIG. 1 is a schematic transverse elevation of a photographic projector of the invention showing the projector with a magazine therein.

Referring now to the drawings, there is schematically illustrated therein a photographic projector 1 having a housing provided with a transverse intermediate wall 2. This transverse intermediate wall 2 of the housing is provided in the region of the optical axis of the projector with a projection window or gate 3 formed by an opening passing through the wall 2, as is particularly apparent from FIG. 3. This wall 2 is also provided with an additional opening 4 through which a magazine 5 is guided for movement parallel to the optical axis, this magazine 5 carrying a series of slides 6 in a well-known manner.

A means is provided for swingably supporting a slide-holding means on the intermediate wall 2 of the housing of the projector. This means takes the form of a pivot pin 7 fixed to the wall 2 and extending through an opening in a slide-holding means 8 so as to support the latter for swinging movement. This slide-holding means 8 is formed itself with a gate or window 9 which registers with the window 3 when the slide-holding means 8 is in the end position thereof shown in FIGS. 1 and 2. This slide-holding means 8 has a pair of guide rails 10 and 10a which serve to hold and guide a slide 6 during movement thereof to and from a position aligned with the window 9. At the position of the holding means 8 which is illustrated in FIGS. 1 and 2 it is possible for a slide-changing means 12 to be moved in the direction of the double-headed arrow 11 (FIG. 1) for the purpose of displacing a slide 6 from the magazine 5 into the projecting position aligned with the window 9 and then back to the magazine 5.

During the actual slide-changing operations the window 9 is covered by a shutter means 13 which interrupts the travel of the projecting light rays through the projecting position along the optical axis. This shutter means 13 is in the form of a plate swingably carried by a pivot 14 which is fixedly carried by the elongated rail 15 which in turn is situated at a small distance from and fixedly carried by the wall 2. This distance between the elongated bar 15 and the surface of the wall 2 which is visible in the drawings is of such a size that the shutter plate 13 can turn without any obstruction in the space between the wall 2 and the guide 15. An elongated tension spring 16 is connected at one end to the shutter 13 and at its opposite end to the wall 2, and this spring 16 seeks to hold the shutter 13 in the covering or light-interrupting position illustrated in FIGS. 1 and 3.

Figure 2:
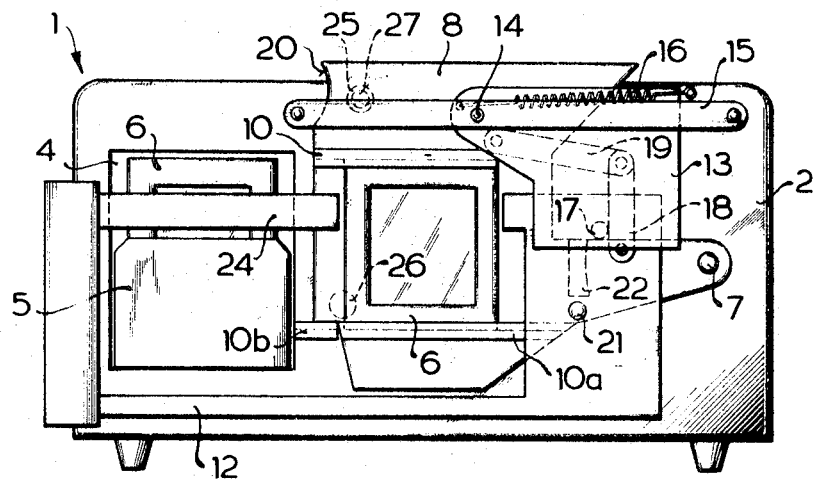
FIG. 2 shows the components of FIG. 1 after the slide-changer has been moved from the position of FIG. 1, where it is at the magazine, to the position of FIG. 2, where it has displaced a slide to the projecting position.

However, the slide-changing means 12 displaces the shutter means 13 to its open or uncovering position when the slide-changing means 12 is shifted to the right from the position of FIG. 1 into position of FIG. 2 in order to transfer a slide from the magazine to the projecting position. This opening of the shutter means 13 takes place by way of a pin 17 forming a projection carried by and projecting from the slide-changing means 12. Shortly before this slide-changing means 12 reaches its end position shown in FIG. 2, the pin 17 comes into engagement with an elongated lever 18 forming part of a linkage means 18, 19. Thus, upon movement of the slide-changing means 12 from the position of FIG. 1 into the position of FIG. 2, the pin 17 will engage the lever 18 of the linkage means in order to swing this lever 18 from the position of FIG. 1 into the position of FIG. 2. This link 18 is pivotally connected with the slide-holding means 8 and also is pivotally connected with a second link or lever 19 of the linkage means 18, 19. This second link 19 is in turn pivotally connected with the shutter plate 13. As a result, the turning of the lever 18 by the pin 17 will be transmitted through the second link 19 to the shutter 13 so as to turn the latter to the open position shown in FIG. 2, this turning taking place in opposition to the spring 16. However, when the slide-changing means is returned to the position of FIG. 1 in order to return a slide from the projecting position to the magazine, the spring 16 can contract in order to swing the shutter 13 in a clockwise direction from the position of FIG. 2 back to the position of FIG. 1 while the lever 18 remains in engagement with and follows the movement of the pin 17 during the initial part of the return movement of the slide-changer 17. Thus, through the action of the spring 16 and the linkage 18, 19 the shutter means 13 is returned to its light-interrupting or closing position which is determined by an unillustrated stop.

Figure 3:
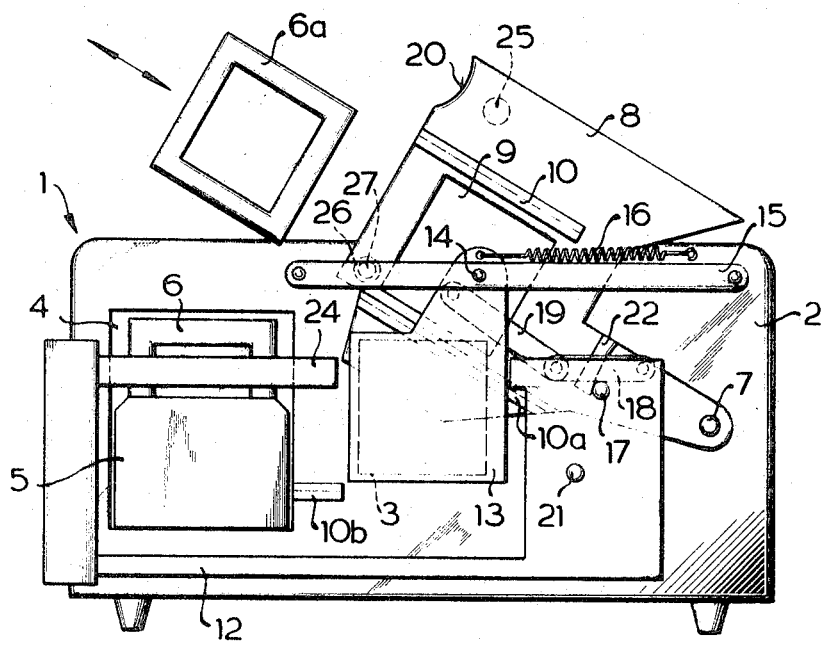
FIG. 3 illustrates the position which the parts take when a slide-holder has been swung outwardly to a position giving free axis for manual introduction and removal of a slide.

When the shutter-holding means is turned in a clockwise direction into the position of FIG. 3 by manipulation of a notch 20 accessible to the operator so that the operator may engage the slide-holding means 8 at this notch 20 in order to turn the slide-holding means 8 to the position of FIG. 3, it is possible even if a magazine 5 is in the projector to manually introduce and remove individual slides into and out of the holder 8, respectively, and FIG. 3 schematically illustrates how a slide 6a can be manually introduced and removed from the holder 8 when the latter has been swung to the position of FIG. 3. The construction of the invention is such that swinging of the slide-holding means 8 to the position of FIG. 3 can only be carried out when the slide-changing means 12 is in the position of FIG. 2, locating a slide at the projecting position. Moreover, return of the slide-changing means 12 to the position of FIG. 1 is prevented as long as the slide-holding means 8 is in the outwardly swung position of FIG. 3. Moreover, the connection between the shutter means 13 and the slide-holding means 8 is such that the shutter means will be displaced to its light-interrupting position in the path of the projecting light rays when the holding means 8 is swung outwardly to the position of FIG. 3, while when the holding means 8 is returned again into the position of FIG. 2, the shutter means 13 will uncover the projecting apertures.

To achieve these results, blocking means and release means are provided in the form of projections and coacting recesses or the like forming part of the several components referred to above. Thus, for this purpose, the slide-changing means 12 is provided with a blocking projection 21 which in the position of the part shown in FIG. 1 extends over a part of the upper edge of the guide rail 10a of the slide-holding means 8. However, even though the projection 21 extends over the rail 10a, it does not extend into the path of movement of a slide and thus does not interfere with the operations. This blocking projection 21 prevents in this way swinging of the holding means 8 into the position of FIG. 3 as long as the projection 21 extends over the rail 10a. When, however, the slide-changing means 12 has been shifted from the position of FIG. 1 into the position of FIG. 2, the blocking pin 21 will assume a position beyond the rail 10a by a distance sufficient to provide for free swinging of the holding means 8 to the position of FIG. 3.

Furthermore, this holding means 8 itself carries a further blocking component 22 provided with an edge 23 extending along a circle whose center is in the turning axis provided by the pivot means 7. This blocking component 22 coacts with the projection 17 of the slide-changer 12. This projection 17, as pointed out above, coacts with the link 18 of the linkage means 18, 19 to control the movement of the shutter means 13. When the holding means 8 is swung outwardly to the position of FIG. 3, the curved edge 23 of the blocking component 22 moves into the region of the projection 17 which is at an elevation slightly higher than the component 22 in the position of the part shown in FIG. 2. Thus, this blocking component 22 will now become located just to the left of the pin 17, as viewed in FIG. 3, and therefore it will not be possible for the operator to return the slide-changing means 12 to the position of FIG. 1 as long as the slide-holding means 8 has been swung out to the position of FIG. 3.

During the swinging of the slide-holding means 8 to the position of FIG. 3, the pivot for the link 18 which is carried by the holding means 8 swings along a circular path the center of which is in the axis of the pivot 7. This change in the position of the pivot axis of the link 18 brings about turning of the levers 18 and 19 with respect to each other in such a way that the linkage means 18, 19 will situate the shutter means 13 in the position of FIG. 3 where the shutter means 13 covers the gate 3 and thus interrupts the travel of the projecting light rays. Thus, during swinging of the holding means 8 from the position of FIG. 2 into the position of FIG. 3 it is possible for the spring 16 to contract in order to turn the shutter 13 from the open position of FIG. 2 into the closed position of FIG. 3 while the link 18 rides along and turns about the pin 17. Thus, at this time the pin 17 serves to guide the link 18 so as to control the movement of the linkage 18, 19 upon turning of the shutter 13 by the spring 16. This projection or pin 17 also prevents upon return of the slide-holding means 8 from the position of FIG. 3 back to the position of FIG. 2 the linkage means formed by the components 18 and 19 from assuming a position different from that illustrated in FIGS. 1 and 2.

The guide rail 10a fixedly carried by the slide-holding means 8 has a length which prevents this rail from engaging the pusher 24 which displaces the slides from the magazine 5 into the projecting position during the movement of the slide-changing means 12 from the position of FIG. 1 into the position of FIG. 2. However, the intermediate wall 2 of the housing of the projector carries a stationary guide rail portion 10b which forms an extension of the rail 10a and bridges the space between the latter and the magazine when the holding means 8 is in the position of FIGS. 1 and 2, so that each slide will be reliably guided along the rails 10b, 10a from the magazine to the projecting location and back.

A detent means is provided for releasably holding the slide-holding means 8 either in the position of FIG. 2 or in the position of FIG. 3. For this purpose the holder 8 is provided with a pair of depressions 25 and 26 forming detent recesses adapted to receive a detent such as a spring-pressed ball 27 or the like carried by the wall 2. Thus, in the end position of the holding means 8 shown in FIGS. 1 and 2, the spring-pressed detent ball 27 is received in the detent recess or depression 25, while it is the recess or depression 26 which receives the spring-pressed ball 27 when the slide-holding means 8 is swung out to the position of FIG. 3.

What is claimed is:

1. In a photographic slide projector, a housing, a slide-changing means coacting with said housing and a magazine carried thereby for displacing a slide from the magazine to a projecting position and back from the projecting position to the magazine, and slide-holding means for holding a slide at the projecting position, said holding means receiving a slide from the slide-changing means and returning a slide thereto, and means connecting said holding means to said housing for swinging movement with respect thereto into and back from a position where a slide may be manually introduced into and removed from said holding means, said slide-holding means including a guide rail for supporting and guiding a slide and a first projection carried by said slide-changing means and coacting with said guide rail to release said slide-holding means for swinging movement only when said slide-changing means is in an end position placing a slide in said projecting position while preventing turning of said slide-holding means with respect to said housing at all other positions of said slide-changing means, a blocking component carried by said slide-holding means and a second projection carried by said slide-changing means and released by said blocking component while said slide-changing means is in said end position thereof only when said slide-holding means is in a given end position where a slide is in said projecting position, while in all other positions of said slide-holding means said blocking component blocks said second projection of said slide-changing means to prevent return of the latter from said end position thereof, shutter means for preventing the travel of projecting light rays through the projecting position, and linkage means coupling said shutter means to said slide-holding means for moving said shutter means in response to swinging movement of said slide-holding means, said second projection coacting with said linkage means for operating the latter to move said shutter means away from a position preventing the travel of projecting light rays through the projecting position when said slide-changing means is displaced to said end position thereof, and said second projection also coacting with said linkage means for moving said shutter means back to a position preventing the travel of projecting light rays through the projecting position when said holding means is swung to said position where a slide may be manually introduced into and removed therefrom, a spring operatively connected with said shutter means for urging the latter to a position preventing the travel of projecting light rays through the projecting position, said shutter means being pivotally connected to said housing for turning movement with respect thereto between a position preventing the travel of projecting light rays through the projecting position and a position displaced from the projection position.

* * * * *